Patented July 3, 1945

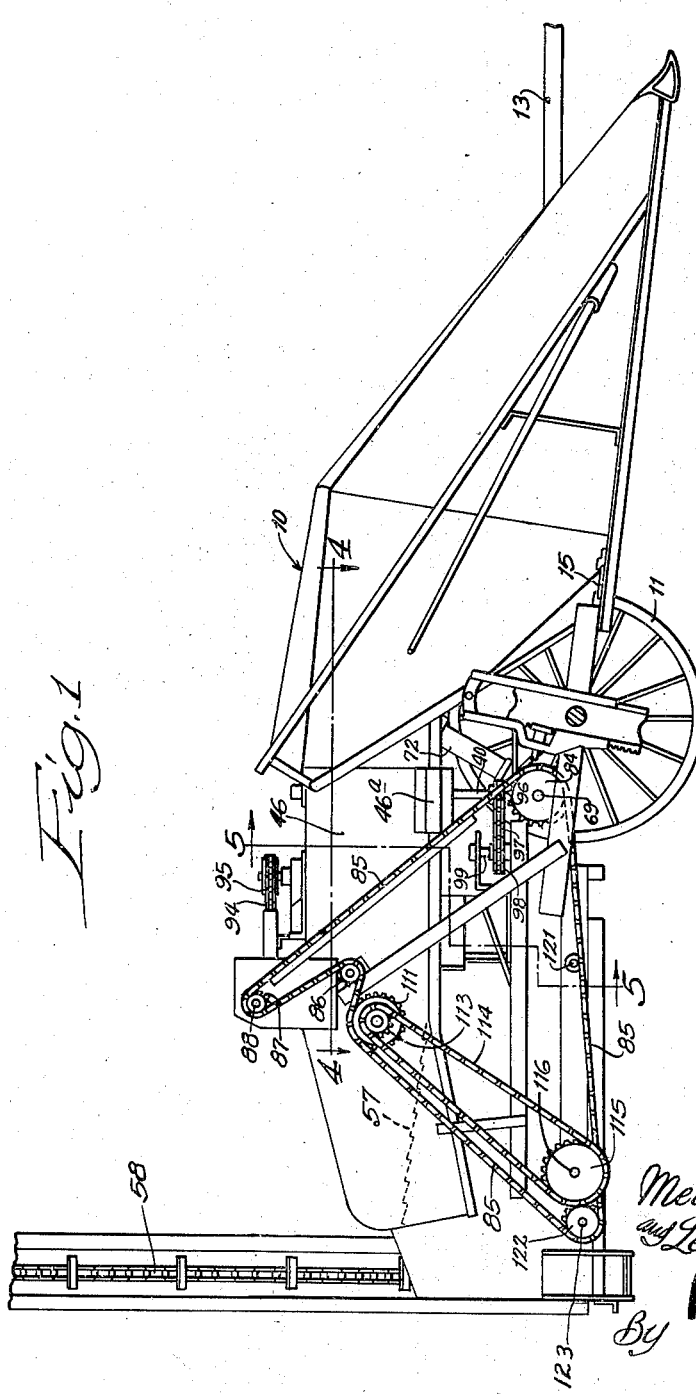

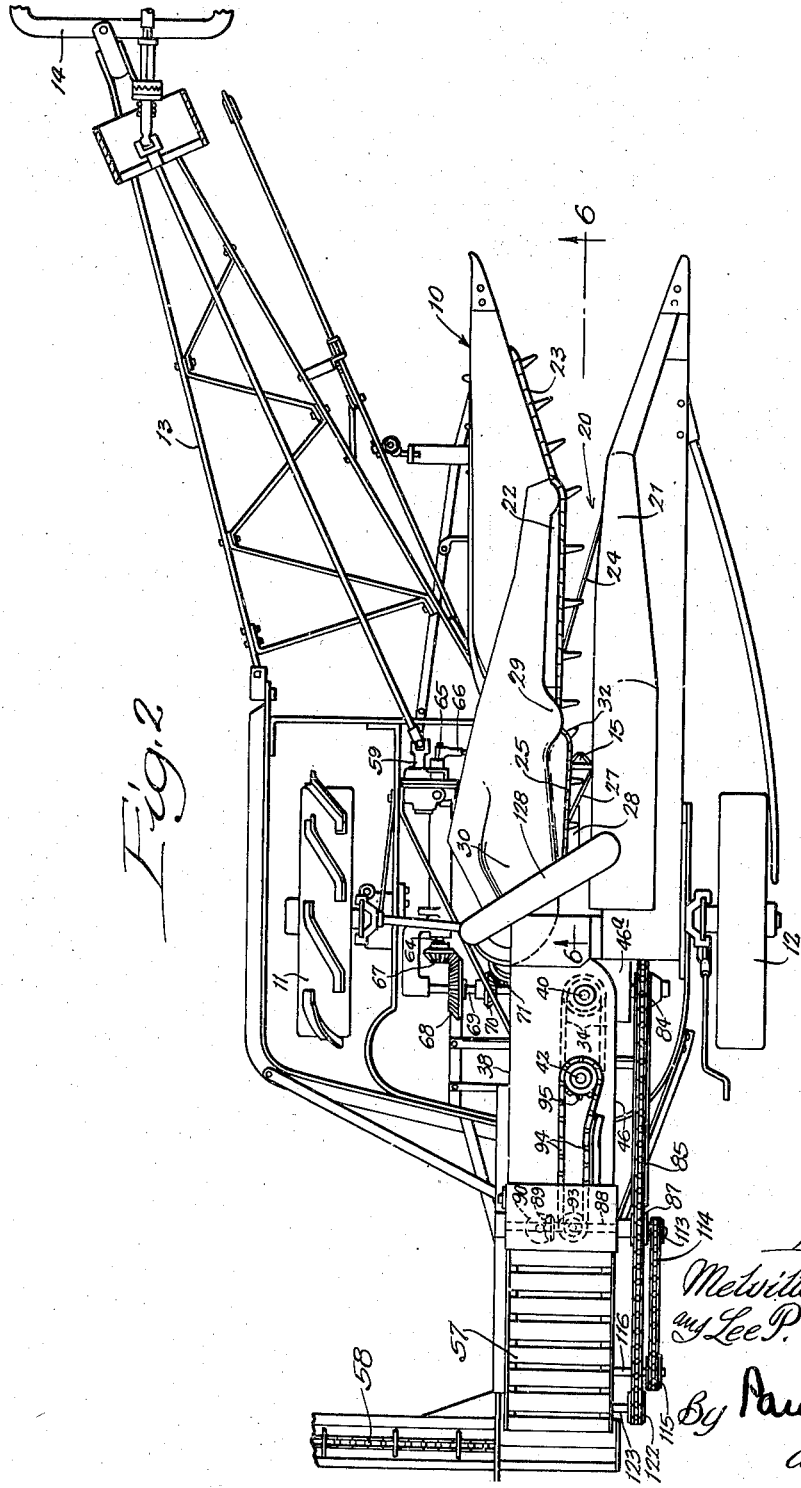

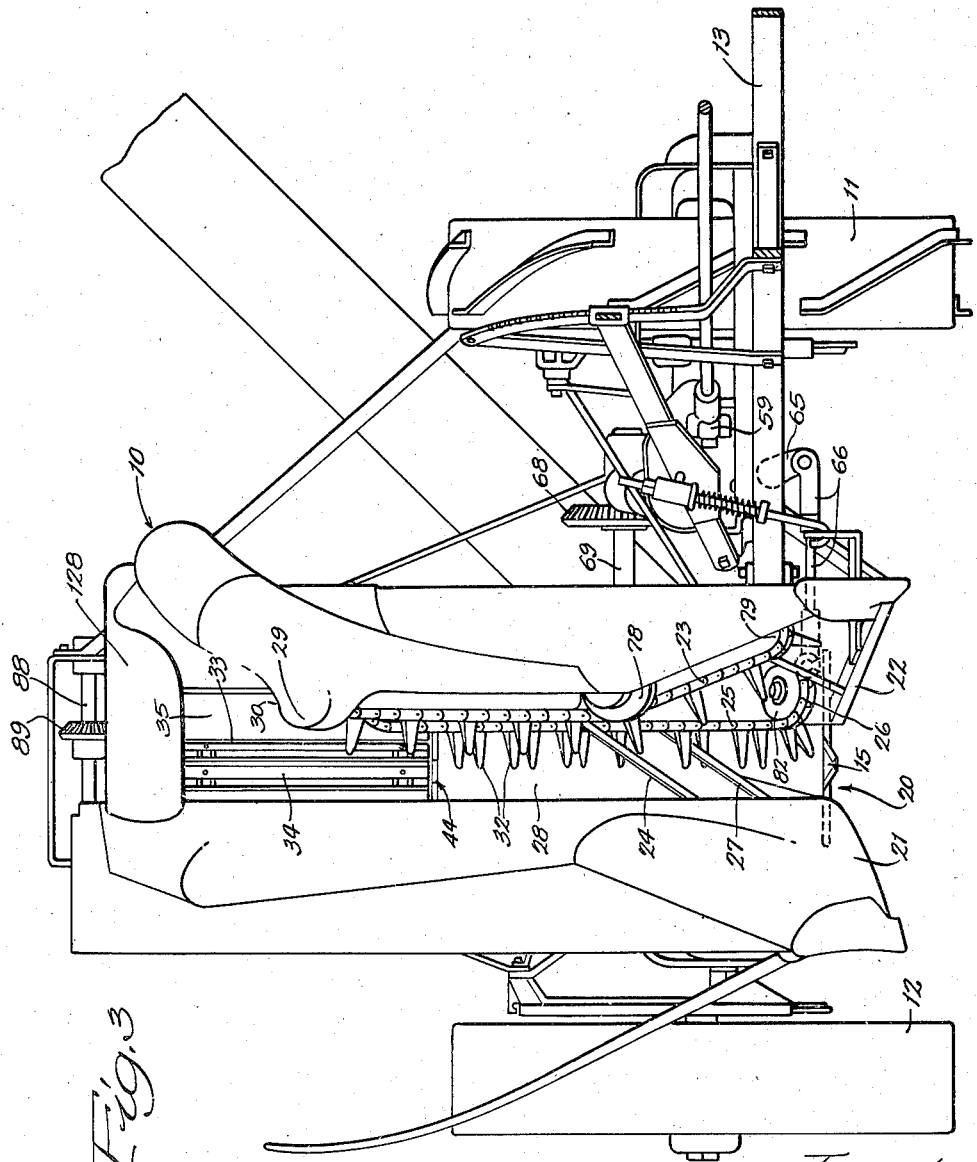

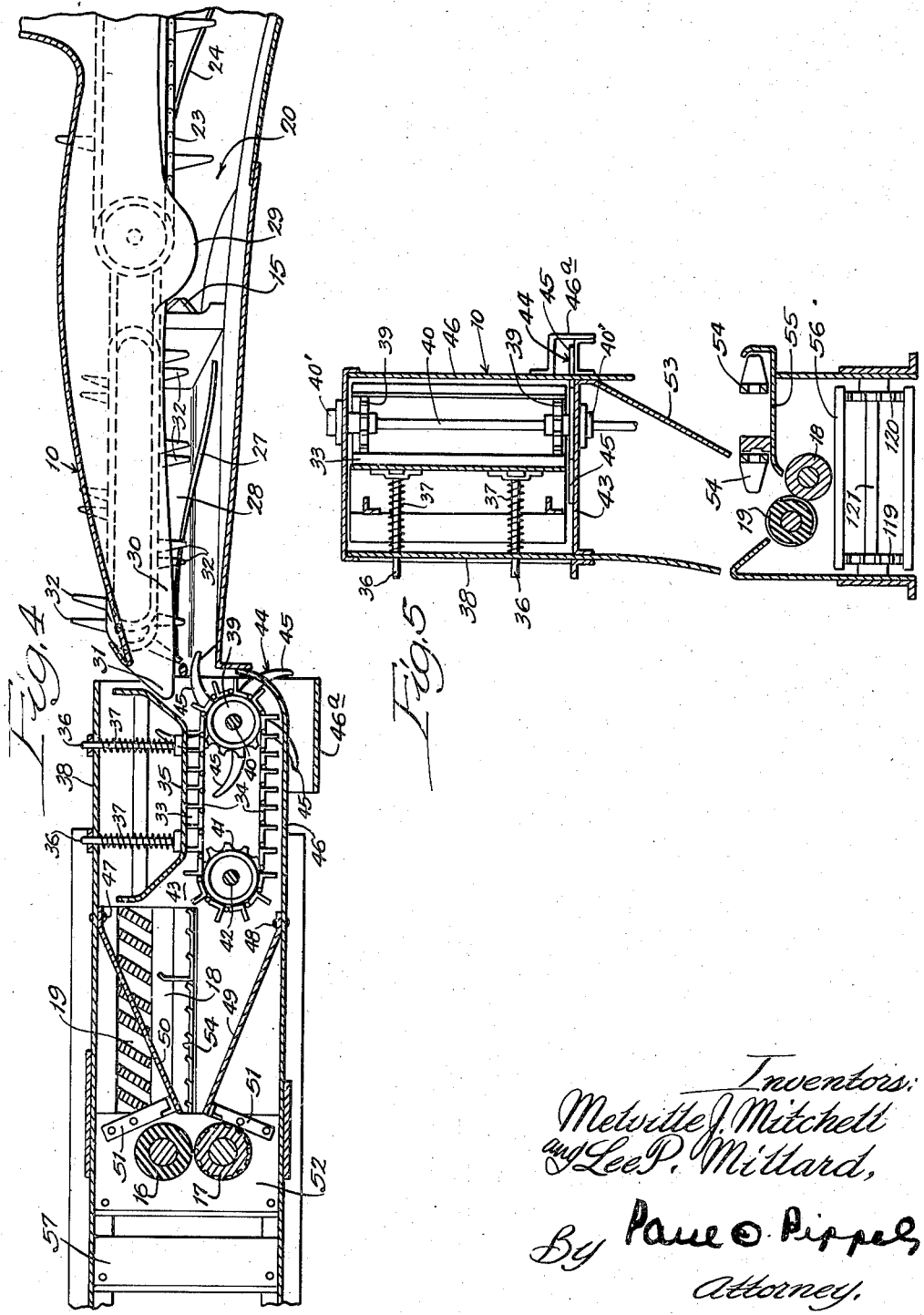

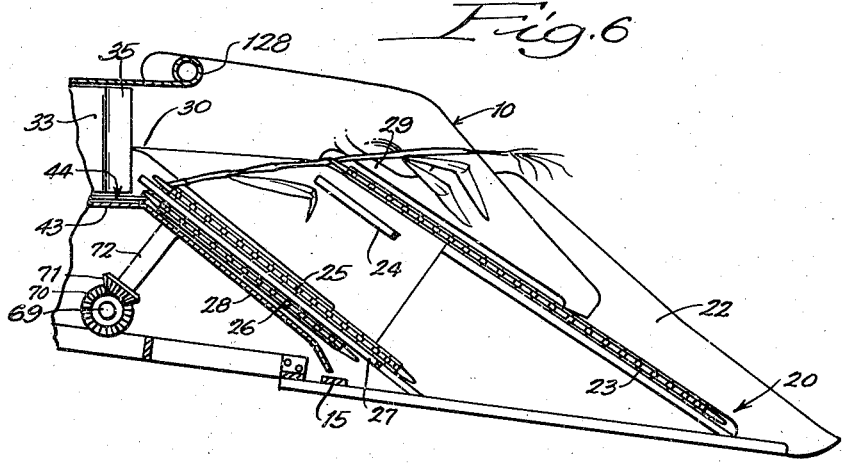
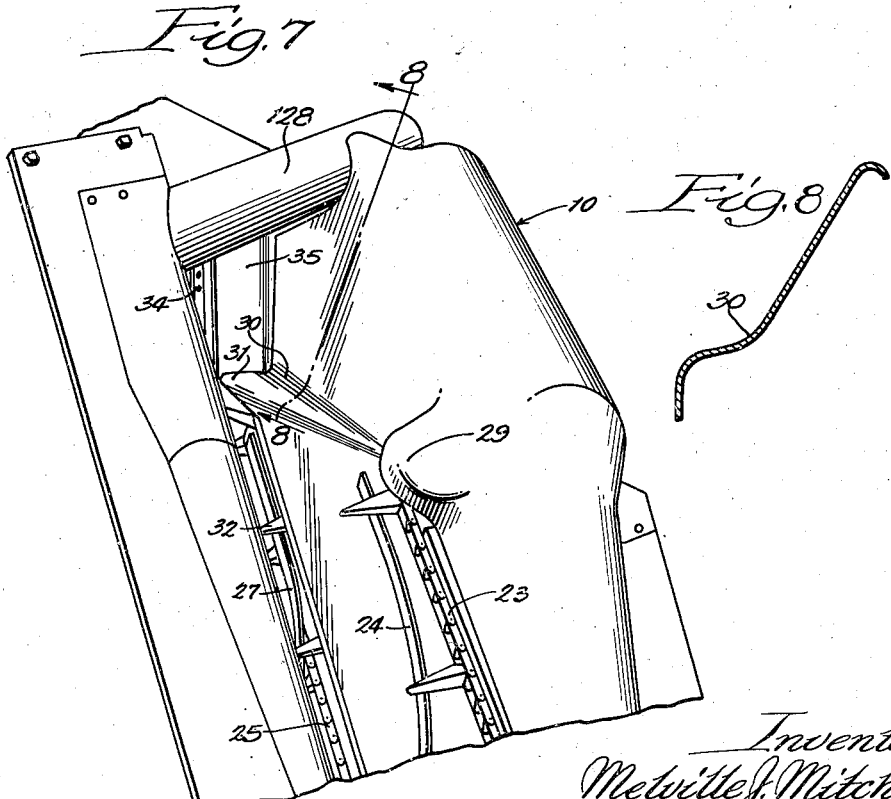
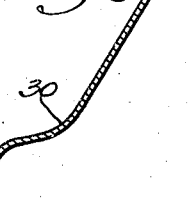

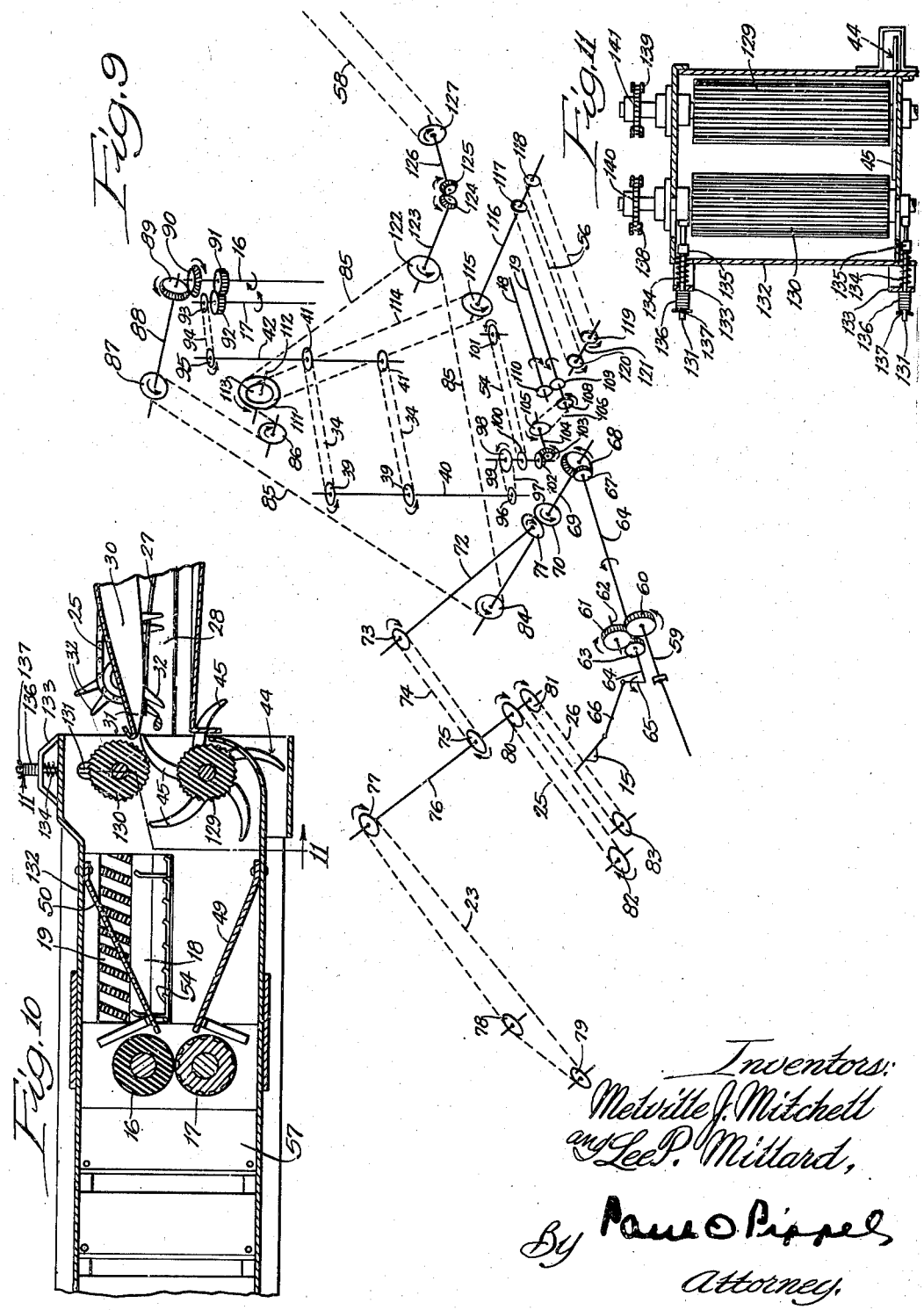

2,379,822

UNITED STATES PATENT OFFICE 2,379,822

HARVESTER

Melville J. Mitchell, Highland Park, and Lee P. Millard, Moline, Ill., assignors to International Harvester Company, a corporation of New Jersey Application August 30, 1943, Serial No. 500,488

28 Claims. (Cl. 56—66)

This invention relates to a harvester. More specifically it relates to a harvester of the type that cuts standing stalks and strips crops from the standing stalks.

The corn harvester now generally used is one that removes ears from standing stalks without detaching the stalks from the ground. There are a number of disadvantages in this manner of picking and in this type of harvester. First, a set of long rolls is required for removing ears from standing stalks. Being long, the rolls are heavy. Second, the picking rolls must be adjustably mounted for the varying picking conditions encountered in corn. Because of the weight of the rolls the mounting of the rolls for adjustability is necessarily costly and involved. Third, there is usually included in the harvester a set of large and heavy husking rolls. These rolls are generally mounted separately from the picking rolls, and so a separate and involved mounting is required for the husking rolls. Fourth, the method of picking involving removal of ears from standing stalks brings certain unavoidable shelling losses. It is virtually impossible to avoid shelling when removal of ears from stalks is done by rolls, for pinching of the ears by the rolls and striking of the ears against the rolls is unavoidable. If the stalks are standing when the ears are removed, there is no way to prevent the shelled corn from becoming lost through the space in the harvester through which the standing stalks must extend. Shelling losses may be quite high with hybrid corn.

The disadvantages discussed above are avoided in a properly designed machine of the type that cuts standing stalks and removes ears from the standing stalks. A machine of this type appears to be advantageous in many ways, and even though prior patents show this type to be very old, the machine has been used only very little. The major obstacle to increased use apparently lies in the handling of the cut stalks between the stalk-cutting means and the ear-removing means. Another problem is to shape the machine so as to adapt it to close association with a tractor.

The present application relates to the transferring of cut stalks from a means for cutting standing stalks to a means for stripping crops from the cut stalks.

An object of the present invention is to provide an improved device for cutting standing stalks and stripping crops from the cut stalks.

A further object is the provision of improved conveying means for moving cut stalks from a cutting means to a stripping means.

Another object is to provide an improved conveying means for moving cut crops from a cutting means.

Still another object is the provision of improved conveying means for conveying cut stalks to a stripping means.

Another object is to provide an improved corn harvester that cuts standing corn stalks and strips corn ears from the cut stalks.

A further object is the provision of improved conveying means for feeding cut corn stalks from a corn stalk cutting means to a stripping means for removing corn ears from cut stalks.

A further object is to provide an improved conveying means for moving cut corn stalks to stripping means for removing corn ears from the cut corn stalks.

Another object is to provide an improved feeding means for conveying cut stalks from a cutting means to a crop-treating device.

Still another object is the provision of improved feeding means for cut crops.

Other objects will appear from the disclosure.

According to the present invention, there is provided a corn harvester comprising means for cutting standing stalks and vertical rolls for removing ears from the cut stalks. Between the cutting means and the rolls is provided a novel feeding means comprising a first vertical throat having inclined feeding elements and a second vertical throat having one side formed of a vertical slat conveyer for moving cut stalks horizontally to the rolls. There is also provided a rotatable member with long outwardly extending fingers that facilitates passage of the cut stalks from the first throat to the second throat. In an alternative form of the second throat, there is provided a pair of vertical rubber rolls that feed the cut stalks to the vertical stripping rolls.

In the drawings:

Figure 1 is a side view, with parts removed, of the harvester of the present invention;

Figure 2 is a plan view of the harvester;

Figure 3 is a front view of the harvester with the hitch frame in section;

Figure 4 is a sectional view taken on the line 4—4 of Figure 1;

Figure 5 is a sectional view taken on the line 5—5 of Figure 1;

Figure 6 is a sectional view taken on the line 6—6 of Figure 2;

Figure 7 is an enlarged perspective view of a portion of the harvester;

Figure 8 is a sectional view taken on the line 8—8 of Figure 7;

Figure 9 is a diagrammatic view in perspective of the driving means of the harvester;

Figure 10 is a sectional view corresponding to Figure 4, showing the modified form of feeding means; and Figure 11 is a sectional view taken on the line 11—11 of Figure 10.

The reference character 10 designates the novel harvester of the present invention. It is supported upon wheels 11 and 12. It is connected by means of an attaching frame 13 to a drawbar 14 of a tractor, not otherwise shown, in such a manner as to trail behind the tractor in offset relationship thereto. The harvester 10 comprises essentially a reciprocating cutter 15, crop treating means in the form of ear snapping means comprising vertical snapping rolls 16 and 17, and husking rolls 18 and 19. The reciprocating cutter 15 is mounted at the base of a vertical throat 20 having a left side 21 and a right side 22. Mounted in the right side 22 is an upper inclined chain 23 extending from a low point of the forward portion of the side 22 to a high point generally above and spaced from the reciprocating cutter 15. A spring strip 24 is secured to the right side 21 and extends over against the left side 22 immediately below the chain 23. There is also provided a pair of lower chains 25 and 26 inclined upwardly and rearwardly from a point generally above and adjacent the reciprocating cutter 15. These chains are also mounted on the right side 22. A spring strip 27 is secured to the left side 21 of the throat 20 and extends over to the right side 22 between the chains 25 and 26. An inclined bottom 28 is provided beneath the chains 25 and 26. Adjacent the upper end of the chain 23 at the chain side of the throat 20 is provided a protuberance 29 which acts to strip stalks from the chain 23 and to shift them laterally. The upper portion of the right side 22 above the upper ends of the chains 25 and 26 is set back as indicated by the reference character 30, as shown in Figures 7 and 8. The very rear end of the right side 22 has a portion shaped as a projection, as indicated by the reference character 31 in Figure 4, so as to allow flights 32 on the chains 25 and 26 to extend out less and less as they progress rearwardly and finally not to extend out at all beyond the portion 31 whereby said portion strips the stalks from the chains and shifts them laterally.

Rearwardly of the vertical throat 20 and slightly offset therefrom is a vertical throat 33 having one side formed as a vertical slat conveyer 34 and the other side formed of a member 35 mounted upon rods 36 and resiliently urged toward the vertical slat conveyer 34 by springs 37 mounted upon the rods 36 and acting between a side member 38 and the member 35. The vertical slat conveyer is engaged by upper and lower sprockets 39 at its forward end and mounted upon a shaft 40 carried by bearings 40' and upper and lower sprockets 41 mounted on its rearward end, and mounted upon a shaft 42 beneath the vertical slat conveyer 34 is a horizontal floor 43, and between the conveyer 34 and the floor 43 is a rotatable member 44 mounted upon the shaft 40 having long curved outwardly extending fingers 45. The spring pressed member 35 and the vertical slat conveyer 34, forming between them the vertical throat 33, are positioned within the side member 38, previously referred to, and a side member 46. The fingers 45 of the rotatable member project through the side member 46, and a guard 46ᵃ is positioned outward of the fingers 45 and the side member 46. Secured to the inner sides of the members 38 and 46 at 47 and 48, respectively, are sheets 49 and 50 converging toward one another in a direction toward the snapping rolls 16 and 17. They are quite close to one another at their rear ends adjacent their snapping rolls so as to present a narrow space at that point for guiding stalks through the snapping rolls. The rear ends of the sheets 49 and 50 are secured to pieces 51, which are in turn secured to a bottom 52 beneath the snapping rolls 16 and 17. The snapping roll 16 is formed of smooth rubber, and the snapping roll 17, of corrugated material. The husking rolls 18 and 19 are positioned below the snapping rolls 16 and 17 and extend longitudinally. The husking roll 18 is formed of smooth wood, and the husking roll 19 is formed of rubber provided with a corrugated spiral. As seen in Figure 5, an inclined member 53 extends downwardly and serves as a guide leading to the husking rolls 18 and 19. Beneath the inclined member 53 is a chain loop 54 resting upon a shelf 55 and serving to forward ears along the husking rolls 18 and 19. Beneath the husking rolls is a husk conveyor 56. The side members 38 and 46 extend rearwardly of the vertical snapping rolls 16 and 17, and a grate 57 is secured between these members rearward of the snapping rolls. A transversely extending wagon elevator 58 is provided at the rear of the harvester 10 and extends from a lower point adjacent the rear end of the husking rolls 18 and 19 transversely upwardly to a wagon, not shown, adapted to be positioned alongside the harvester 10 for receiving ears therefrom.

The various parts just described are driven in the manner shown in Figure 9. As seen in this figure, a power take-off shaft 59, extending from the tractor, not shown, has secured at its rear end a gear 60 meshing with a gear 61 mounted upon a jack-shaft 62. The gear 61 meshes with a gear 63 secured upon a longitudinal shaft 64. A crank arm 65 secured to the front end of the longitudinal shaft 64 is connected to a link 66 in turn connected to the reciprocating cutter 15. The rear end of the longitudinal shaft 64 carries a bevel gear 67 meshing with a bevel gear 68 secured to a shaft 69. A bevel gear 70 is secured to the transverse shaft 69 and meshes with a bevel gear 71 secured upon an inclined shaft 72 carrying at its upper end a sprocket 73. The sprocket 73 is engaged by a sprocket chain 74 in turn engaging a sprocket 75 secured to a second inclined shaft 76. Secured to the upper end of the inclined shaft 76 is a sprocket 77, which is engaged by the upper chain 23. Idler sprockets 78 and 79 are mounted within the chain 23. Secured to the lower end of the inclined shaft 76 are a sprocket 80 meshing with the lower chain 25 and a sprocket 81 meshing with the lower chain 26. Sprockets 82 and 83 are mounted within the forward ends of the sprocket chains 25 and 26. Secured to the outer end of the transverse shaft 69 is a sprocket 84 engaged by a sprocket chain 85. The sprocket chain 85 engages an idler sprocket chain 86 and a sprocket 87 secured upon a shaft 88. Also secured upon the shaft 88 is a bevel gear 89 meshing with a bevel gear 90 secured to the snapping roll 16. Spur gears 91 and 92, secured respectively to the snapping rolls 16 and 17, transmit drive from the snapping roll 16 to the snapping roll 17. A sprocket 93 is secured to the upper end of the snapping roll 17 and is engaged by a sprocket chain 94 in turn engaging a sprocket 95 secured to the upper end of the shaft 42, upon which are mounted the sprockets 41 positioned within the rear end of the vertical slat conveyer 34. These sprockets drive the vertical slat conveyer. The vertical slat conveyer 34 engages and drives the sprockets 39 mounted within the front end of the conveyer upon the shaft 40. The lower end of the shaft 40 carries a sprocket 96 engaged by a chain 97 in turn engaging a sprocket 98 secured to a shaft 99. A sprocket 100 secured to the shaft 99 drives the ear forwarder chain loop 54, being positioned within the forward end thereof. An idler sprocket 101 is positioned within the rear end of the chamber 54. A bevel gear 102 is secured to the lower end of the shaft 99 and meshes with a bevel gear 103 secured upon a shaft 104. The shaft 104 carries a sprocket 105 meshing with a chain 106 in turn meshing with a sprocket 108 secured to the husking roll 19. Gears 109 and 110 secured respectively to the husking roll 19 and to the husking roll 18 transmit drive from the husking roll 19 to the husking roll 18.

The sprocket chain 85 engages a sprocket 111 secured to a shaft 112. Also secured to the shaft 112 is a sprocket 113 engaged by a chain 114 engaging in turn a sprocket 115 secured upon a transverse shaft 116. Also secured to the shaft 116 are sprockets 117 and 118 engaging the rear end of the husking conveyer 56. The forward end of the husking conveyer 116 is engaged by idler sprockets 119 and 120 mounted upon a shaft 121. The sprocket chain 85 engages a sprocket 122 secured to a shaft 123. A bevel gear 124 secured to the shaft 123 engages a bevel gear 125 secured to a shaft 126, to which is secured a sprocket 127 driving the wagon elevator 58.

In operation, the harvester 10 is pulled through a corn field so that a row of standing corn stalks passes into the throat 20. The chain 23 serves to gather the stalks and guide them to the cutter 15. The spring strip 24 forces the standing stalks over against the chain 23. After the stalks are cut, the upper portions continue in engagement with the chain 23 under the influence of the spring strip 24 for a short while. Immediately before cutting, the lower chain 25 engages the stalks, and the lower chain 26 engages the stalks just as they are cut. The chains 25 and 26 move the butt ends of the cut stalks upwardly and rearwardly along the inclined bottom 28. These chains are driven faster than the chain 23, so that the stalks approach a horizontal position as the butt ends are moved up the inclined bottom 28. This position is illustrated by the corn stalk shown in Figure 6. As the cut stalks move to the upper end of the chain 23 and are released therefrom by the action of the protuberance 29, the upper ends move to the right side of the throat 20 so as to be over the protuberance 29 and the setback portion 30. The setback portion allows this action. Thus, they do not interfere with stalks more nearly vertical moving into the throat 20 to the reciprocating cutter 15. As the butt ends of the stalks reach the top of the chains 25 and 26, they are stripped therefrom by the projection 31, and, at the moment that this happens, the stalks are engaged by the fingers 45 of the rotatable member 44 and are guided into the throat 33. Thus, the butt ends are continuously engaged, for, as they leave the flights 32 of the chains 25 and 26, they are immediately engaged by the fingers 45. As the cut stalks, now horizontal or nearly horizontal, pass into the throat 33, they are engaged by the vertical flight conveyer 34 and are moved horizontally toward the snapping rolls 16 and 17. The horizontal bottom 43 positively prevents downward movement of the cut stalks by engaging the butt ends thereof. The member 35, forming one side of the throat 33, yields against the springs 36 in accordance with the volume and size of the corn stalks and ears connected thereto passing through the throat 33. The vertical slat conveyer 34 moves the stalks horizontally rearwardly to the snapping rolls 16 and 17 and causes the stalks to pass between the rolls, butt ends first. The sheets 49 and 50 guide the butt ends to the rolls 16 and 17. The rolls 16 and 17 are rotated so as to pull the stalks through, and the ears connected to the stalks are pinched off and dropped onto the husking rolls 18 and 19. The conveyer chain loop 54 propels the ears rearwardly along the husking rolls 50 and 51, and the ears are husked and passed to the wagon elevator 58.

The rotatable member 44 with the long fingers 45 is required to facilitate the passage of the cut stalks from the throat 20 to the throat 33, because there are separate conveying means in the two throats, and the rotatable member 44 must bridge the gap between the throats. The lower chains 25 and 26 with the flights 32 in the throat 20 are inclined and move the cut stalks up the inclined bottom 28, whereas the vertical flight conveyer 34, operating as the conveying means in the throat 33, moves horizontally and moves the stalks horizontally. This change in angle of the direction of movement from the incline of the chains 25 and 26 to the horizontal of the vertical slat conveyer 34 makes the use of the rotatable member 44 with its long fingers 45 necessary. The throat 33 is slightly offset to the left of the throat 20. It has been discovered that this offset is necessary for the proper feeding of the cut stalks from the throat 20 to the throat 33. As the stalks pass from the throat 20 to the cutter 15, they are standing and therefore generally vertical. After they are cut, their butt ends are conveyed rearwardly faster than the upper ends and consequently they approach the horizontal. At the same time, the upper ends are displaced somewhat to the right side of the throat 20 under the action of the protuberance 29 and the setback portion 30. Then the butt ends of the cut stalks, having reached the top of the chains 25 and 26, are engaged by the fingers 45 of the rotatable member 44 and are fixed somewhat to the left into the throat 33. As the cut stalks move completely into the throat 33, the upper ends thereof must, of course, move somewhat to the left, so that the stalks extend generally longitudinally through the throat 33. When they are in the throat 33, they are horizontal, or as nearly horizontal as the faster speed of the chains 25 and 26 and the action of the fingers 45 may have caused them to be. It should be noted from Figure 2 and from Figure 7 that there is provided a hood 128 that extends at a substantial angle to a direction transverse of the throat 20. This hood supplements the action of the setback portion 30 in the side of the throat 20. For example, if the stalks have not became nearly horizontal but have remained vertical, and the upper ends have not moved over to the right on the setback portion, the upper ends come in contact with the hood 128 and are moved to the right so as to be out of the way of incoming stalks.

It will be apparent from the foregoing description that there has been provided a new and novel feeding means for transferring cut corn stalks from the reciprocating cutter 15 to vertical snapping rolls 16 and 17 so that the stalks move butt end first through the snapping rolls. In the broader sense of the word, there has been provided conveying means for moving cut stalks from a cutting means to a means for stripping crops from the cut stalks. This conveying means is novel in its relation to the cutting means and the stripping means, also in relation to the stripping means alone, also in relation to the cutting means alone, and also per se or without relation to either the stripping means or the cutting means. In a general way, this conveying means comprises a first vertical throat in which cut stalks are moved upwardly and a second vertical throat in which the cut stalks are moved horizontally. It should be noted that the transverse space occupied by the conveying means is relatively small and thus it may adapt the device with which it is associated, namely, one that cuts standing stalks and strips crops from the standing stalks, to mounting upon a tractor within the wheel line of a tractor. Such a mounting is not shown in the present application, and it is not intended that this relationship be claimed here. It is only desired to point out that the novel conveying means of the present invention, because of its narrow width, would facilitate a mounting upon a tractor.

In a modification shown in Figures 10 and 11, a pair of ribbed rubber rolls 129 and 130 are substituted for the slat conveyer 34 and the spring pressed member 35. The roll 129 is fixedly mounted and carries at its lower end the rotatable member 44 with its long curved fingers 45. The roll 130 is slidably mounted so that the distance between it and the roll 129 may be varied to accommodate various sizes of crops passing between the rolls. The ends of the rolls are carried on rods 131 extending through a side member 132 and through brackets 133. On each rod 131, there is positioned a spring 134 between a shoulder 135 on the rod 133. The spring 134 moves the roll 130 toward the roll 129 to the extent permitted by an adjustable lot 136 of washers positioned on the end of the rod outside of the bracket 133. The washers are held on the rod 131 by a cotter-pin 137. If the number of washers 136 is reduced, the roll 130 may be moved closer to the roll 129. The rolls 129 and 130 in no sense of the word act as stripping means, for the space between them is sufficient to pass the stalks into attached ears. The rolls are driven from the upper ends of the vertical snapping rolls 16 and 17 through sprockets, not shown, secured to the upper ends of the vertical snapping rolls 16 and 17, through sprocket chains 138 and 139, and sprockets 140 and 141 secured to the upper ends of the rolls 129 and 130. The action of the rolls 129 and 130 is somewhat similar to that of the vertical slat conveyer 34 and the spring pressed member 35. The flights 32 on the chains 25 and 26 move the butt ends upwardly to a point where they are stripped by the projection 31 and the fingers 45 on the rotatable member 44 immediately engaging the butt ends and bring the stalks with their attached ears between the rolls 130 and 129. They move the stalks to the snapping rolls 16 and 17.

The intention is to limit the invention only within the scope of the appended claims.

What is claimed is:

1. In combination, a mobile supporting frame, cutting means for cutting standing stalks, means mounting the cutting means on the frame, means forming a first generally vertical throat extending rearwardly from the cutting means, means mounting the first-throat-forming means on the frame, upper and lower conveyer elements mounted in the side of the first throat and extending upwardly and rearwardly for conveying cut stalks from the cutting means, means for running the lower conveyer element faster than the upper conveyer element to cause the elements to move the stalks butt end first, means forming a second narrow generally vertical throat having one side formed of a member resiliently urged toward the other side and the other side formed of a conveyer of considerable continuous vertical extent moving generally horizontally for acting in cooperation with the resiliently mounted member to move cut stalks from the first throat, means mounting the second-throat-forming means on the frame, stripping means for removing crops from cut stalks fed by the conveyer, and means mounting the stripping means on the frame.

2. In combination, a mobile supporting frame, cutting means for cutting standing stalks, means mounting the cutting means on the frame, conveying means extending rearwardly and upwardly from the cutting means for conveying cut stalks from the cutting means, means mounting the conveying means on the frame, means forming a narrow generally vertical throat having one side formed of a member resiliently urged toward the other side and the other side formed of a conveyer having vertical slats moving generally horizontally for acting in cooperation with the resiliently mounted member to move cut stalks from the conveying means, means mounting the throat-forming means on the frame, stripping means for removing crops from cut stalks fed by the conveyer, and means mounting the stripping means on the frame.

3. In combination, a supporting frame, means forming a first vertical throat having an inclined bottom, means mounting the first-throat-forming means on the frame, spaced inclined conveying means mounted in the throat and operating at different speeds for feeding stalks through the throat up the inclined bottom and simultaneously changing their position from generally vertical to angled to the vertical with butt end first, means forming a second vertical throat having a horizontal bottom, means mounting the second-throat-forming means on the frame, and horizontal conveying means mounted in the second throat for feeding the stalks butt end first through the second throat, a rotatable member having outwardly extending fingers and being positioned adjacent the bottoms of the throats to engage the stalks for facilitating passage of the stalks from the first throat to the second throat, and means mounting the rotatable member on the frame.

4. In combination, a mobile supporting frame, cutting means for cutting standing stalks, means mounting the cutting means on the frame, stripping means for stripping crops from stalks cut by the cutting means, means mounting the stripping means on the frame, means forming a first vertical throat having an inclined bottom leading from the cutting means, means mounting the first-throat-forming means on the frame, spaced inclined conveying means mounted in the first throat and operating at different speeds for feeding the cut stalks from the cutting means through the first throat and simultaneously changing the position of the stalks from generally vertical to angled to the vertical with butt ends first, means forming a second vertical throat having a horizontal bottom and leading from the first throat toward the stripping means, means mounting the second-throat-forming means on the frame, horizontal conveying means mounted in the second throat for feeding cut stalks butt ends first through the second throat, a rotatable member having outwardly extending fingers and being positioned adjacent the bottoms of the throats to guide the butt ends of the cut stalks from the first throat to the second throat, and means mounting the rotatable member on the frame.

5. In combination, a mobile supporting frame, cutting means for standing stalks, means mounting the cutting means on the frame, means forming a first vertical throat having an inclined bottom extending from the cutting means, means mounting the first-throat-forming means on the frame, inclined conveying means mounted in the first throat for feeding cut stalks from the cutting means through the first throat, means forming a second vertical throat extending from the first throat and having one side formed as a horizontal conveyor having vertical slats, means mounting the second-throat-forming means on the frame, a rotatable member positioned beneath the forward end of the slat conveyer and having fingers engageable with the butt ends of cut stalks and passing over the inclined bottom and the horizontal bottom so as to facilitate passage of cut stalks from the first throat to the second throat, means mounting the rotatable member on the frame, stripping means presenting a narrow space for stripping crops from stalks cut by the cutting means by passage therethrough, the narrow space extending generally in the direction of the second throat and being formed of complemental spaced parts positioned opposite one another, and means mounting the stripping means on the frame.

6. In combination, a mobile supporting frame, cutting means for standing stalks, means mounting the cutting means on the frame, means forming a first vertical throat extending from the cutting means, means mounting the first-throat-forming means on the frame, inclined conveying means mounted in the first throat for feeding cut stalks from the cutting means through the first throat, means forming a second vertical throat extending from the first throat, horizontal conveying means mounted in the second throat for conveying cut stalks through the second throat, means mounting the second-throat-forming means on the frame so as to make the second throat somewhat offset from the first throat for facilitating passage of cut stalks from the first throat to the second throat, stripping means presenting a narrow space for stripping crops from stalks cut by the cutting means by passage therethrough, the narrow space extending generally in the direction of the second throat and being formed of complemental spaced parts positioned opposite one another, and means mounting the stripping means on the frame.

7. In combination, a mobile supporting frame, cutting means for standing stalks, means mounting the cutting means on the frame, means forming a first vertical throat having an inclined bottom extending from the cutting means, means mounting the first-throat-forming means on the frame, inclined conveying means mounted in the first throat for feeding cut stalks from the cutting means through the first throat, means forming a second vertical throat having a horizontal bottom extending from the first throat, horizontal conveying means mounted in the second throat for conveying cut stalks through the second throat, means mounting the second-throat-forming means on the frame so as to make the second throat somewhat offset from the first throat for facilitating passage of cut stalks from the first throat to the second throat, stripping means presenting a narrow space for stripping crops from stalks cut by the cutting means by passage therethrough, the narrow space extending generally in the direction of the second throat and being formed of complemental spaced parts positioned opposite one another, and means mounting the stripping means on the frame.

8. In combination, a mobile supporting frame, cutting means for standing stalks, means mounting the cutting means on the frame, means forming a first vertical throat extending from the cutting means, means mounting the first-throat-forming means on the frame, inclined conveying means mounted in the first throat for feeding cut stalks from the cutting means through the first throat, means forming a second vertical throat extending from the first throat, horizontal conveying means mounted in the second throat for conveying cut stalks through the second throat, means mounting the second-throat-forming means on the frame so as to make the second throat somewhat offset from the first throat for facilitating passage of cut stalks from the first throat to the second throat, means positioned adjacent the juncture of the throats so as to be engageable with the butt ends of the cut stalks for facilitating passage of cut stalks from the first throat to the second throat, stripping means presenting a narrow space for stripping crops from stalks cut by the cutting means by passage therethrough, the narrow space extending generally in the direction of the second throat and being formed of complemental spaced parts positioned opposite one another and means mounting the stripping means on the frame.

9. In combination, a mobile supporting frame, cutting means for standing stalks, means mounting the cutting means on the frame, means forming a first vertical throat extending from the cutting means, means mounting the first-throat-forming means on the frame, inclined conveying means mounted in the first throat for feeding cut stalks from the cutting means through the first throat, means forming a second vertical throat extending from the first throat, horizontal conveying means mounted in the second throat for conveying cut stalks through the second throat, means mounting the second-throat-forming means on the frame so as to make the second throat somewhat offset from the first throat for faciliating passage of cut stalks from the first throat to the second throat, a rotatable member mounted at the forward end of the second throat so as to be offset therefrom in the opposite direction from the first throat and having fingers engageable with the butt ends of the cut stalks so as to facilitate passage of the cut stalks from the first throat to the second throat, stripping means presenting a narrow space for stripping crops from stalks cut by the cutting means by passage therethrough, the narrow space extending generally in the direction of the second throat and being formed of complemental spaced parts positioned opposite one another, and means mounting the stripping means on the frame.

10. In combination, a mobile supporting frame, cutting means for standing stalks, means mounting the cutting means on the frame, means forming a first vertical throat having an inclined bottom extending from the cutting means, means mounting the first-throat-forming means on the frame, inclined conveying means mounted in the first throat for feeding cut stalks from the cutting means through the first throat, means forming a second vertical throat having a horizontal bottom extending from the first throat, horizontal conveying means mounted in the second throat for conveying cut stalks through the second throat, a rotatable member mounted at the forward end of the second throat so as to be offset therefrom in the opposite direction from the first throat and having fingers engageable with the butt ends of the cut stalks so as to facilitate passage of the cut stalks from the first throat to the second throat, stripping means presenting a narrow space for stripping crops from stalks cut by the cutting means by passage therethrough, the narrow space extending generally in the direction of the second throat and being formed of complemental spaced parts positioned opposite one another, and means mounting the stripping means on the frame.

11. In combination, a mobile supporting frame, cutting means for cutting standing stalks, means mounting the cutting means on the frame, means forming a vertical throat extending from the cutting means and having an upper portion of one side outwardly offset from the lower portion of the said one side, means mounting the throat-forming means on the frame, conveying means mounted in the throat for moving cut stalks from the cutting means through the throat, the offset of the upper portion of the one side of the throat serving to shift the upper portion of the cut stalks to one side to avoid interference with standing stalks coming to the cutting means.

12. In combination, a mobile supporting frame, cutting means for cutting standing stalks, means mounting the cutting means on the frame, means forming a vertical throat extending from the cutting means and having an inclined bottom and an upper portion of one side outwardly offset from the lower portion of the said one side, means mounting the throat-forming means on the frame, upper and lower inclined conveying means mounted in the throat, means operating the lower conveying means faster than the upper conveying means to move the cut stalks through the throat butt end first, the offset of the upper portion of the one side of the throat serving to shift the upper portion of the cut stalks to one side to avoid interference with standing stalks coming to the cutting means.

13. In combination, a mobile supporting frame, cutting means for cutting standing stalks, means mounting the cutting means on the frame, means forming a vertical throat extending upwardly, forwardly, and rearwardly from the cutting means and having an inclined bottom and an upper portion of one side outwardly offset from the lower portion of the said one side rearwardly of the cutting means, upper inclined conveying means extending from forward of the cutting means rearwardly to the offset upper portion, lower inclined conveying means extending adjacent the bottom of the throat rearwardly from the cutting means, means for running the lower conveying faster than the upper conveying means to move the cut stalks butt end first through the throat, the offset of the upper portion of the one side of the throat serving to shift the upper portion of the cut stalks to one side to avoid interference with standing stalks coming to the cutting means.

14. In combination, a mobile supporting frame, cutting means mounted on said frame for cutting standing stalks, means on the frame forming a narrow longitudinally-extending throat leading rearwardly and upwardly from the cutting means, vertically spaced independent conveying means positioned along the throat for moving cut stalks upwardly, the lower one of said conveying means being driven at a speed substantially higher than the upper conveyor means whereby the lower ends of the stalks are moved faster than the upper ends, means on the frame forming a second narrow longitudinally-extending substantially horizontal throat leading rearwardly from the first throat, conveying means mounted in said second throat for moving the cut stalks butt end first longitudinally in a substantially horizontal position, and stripping means positioned at the rear of said second throat in a position to receive stalks conveyed thereto and to strip crops therefrom.

15. In combination, a mobile supporting frame, cutting means mounted on said frame for cutting standing stalks, means on the frame forming a narrow longitudinally-extending throat leading rearwardly and upwardly from the cutting means, vertically spaced independent conveying means positioned along the throat for moving cut stalks upwardly, the lower one of said conveying means being driven at a speed substantially higher than the upper conveyor means whereby the lower ends of the stalks are moved faster than the upper ends, means on the frame forming a second narrow longitudinally-extending substantially horizontal throat leading rearwardly from the first throat, conveying means mounted in said second throat for moving the cut stalks butt end first longitudinally in a substantially horizontal position, a rotatable stalk-transferring means having fingers extending into one of the throats near the adjacent ends of the throats, and stripping means positioned at the rear of said second throat in a position to receive stalks conveyed thereto and to strip crops therefrom.

16. In combination, a mobile supporting frame, cutting means mounted on said frame for cutting standing stalks, means on the frame forming a narrow longitudinally-extending throat leading rearwardly and upwardly from the cutting means, said throat having a bottom extending upwardly to the rear, vertically spaced independent conveying means positioned along the throat for moving cut stalks upwardly, the lower one of said conveying means being driven at a speed substantially higher than the upper conveyor means whereby the lower ends of the stalks are moved faster than the upper ends, means on the frame forming a second narrow longitudinally-extending substantially horizontal throat leading from the first throat in laterally offset relation with respect thereto, conveying means mounted in said second throat for moving the cut stalks butt end first longitudinally in a substantially horizontal position, and stripping means positioned at the rear of said second throat in a position to receive stalks conveyed thereto and to strip crops therefrom.

17. In combination, a mobile supporting frame, cutting means mounted on said frame for cutting standing stalks, means on the frame forming a narrow longitudinally-extending throat leading rearwardly and upwardly from the cutting means, said throat having a bottom extending upwardly to the rear, vertically spaced independent conveying means positioned along the throat for moving cut stalks upwardly, the lower one of said conveying means being driven at a speed substantially higher than the upper conveyor means whereby the lower ends of the stalks are moved faster than the upper ends, means on the frame forming a second narrow longitudinally-extending substantially horizontal throat leading from the first throat in laterally offset relation with respect thereto, means for transferring stalks from the first throat laterally to the second throat, conveying means mounted in said second throat for moving the cut stalks butt end first longitudinally in a substantially horizontal position, and stripping means positioned at the rear of said second throat in a position to receive stalks conveyed thereto and to strip crops therefrom.

18. In combination, a mobile supporting frame, cutting means mounted on said frame for cutting standing stalks, means on the frame forming a narrow longitudinally-extending throat leading rearwardly from the cutting means, said throat having a bottom extending rearwardly and upwardly, vertically spaced independent conveying means positioned along the throat for moving cut stalks rearwardly upwardly, the lower one of said conveying means being driven at a speed substantially higher than the upper conveyor means whereby the lower ends of the stalks are moved faster than the upper ends and the stalks are delivered butt ends first, means on the frame forming a second narrow longitudinally-extending throat leading rearwardly from the first throat in laterally offset relation with respect thereto, vertically arranged conveying means mounted in one side of said second throat for moving the cut stalks rearwardly butt ends first longitudinally in a substantially horizontal position, said means including a slatted conveyor extending for a substantially longitudinal distance and a vertical pressure plate resiliently urged against the conveyor, and ear-snapping rollers positioned at the rear of said second throat in a position to receive stalks conveyed thereto and to strip crops therefrom.

19. In combination, a mobile supporting frame, cutting means mounted on said frame for cutting standing stalks, means on the frame forming a narrow longitudinally-extending throat leading rearwardly from the cutting means, said throat having a bottom extending rearwardly and upwardly vertically spaced independent conveying means positioned along the throat for moving cut stalks rearwardly upwardly, the lower one of said conveying means being driven at a speed substantially higher than the upper conveyor means whereby the lower ends of the stalks are moved faster than the upper ends and the stalks are delivered butt ends first, means on the frame forming a second narrow longitudinally-extending throat leading rearwardly from the first throat in laterally offset relation with respect thereto, vertically arranged conveying means mounted in one side of said second throat for moving the cut stalks rearwardly butt ends first longitudinally in a substantially horizontal position, said means including a slatted conveyor extending for a substantially longitudinal distance, and ear-snapping rollers positioned at the rear of said second throat in a position to receive stalks conveyed thereto and to strip crops therefrom.

20. In combination, a mobile supporting frame, cutting means mounted on said frame for cutting standing stalks, means on the frame forming a narrow longitudinally-extending throat leading rearwardly from the cutting means, said throat having a bottom extending rearwardly and upwardly, vertically spaced independent conveying means positioned along the throat for moving cut stalks rearwardly upwardly, the lower one of said conveying means being driven at a speed substantially higher than the upper conveyor means whereby the lower ends of the stalks are moved faster than the upper ends and the stalks are delivered butt ends first, means on the frame forming a second narrow longitudinally-extending throat leading rearwardly from the first throat in laterally offset relation with respect thereto, vertically arranged conveying means mounted in one side of said second throat for moving the cut stalks rearwardly butt ends first longitudinally in a substantially horizontal position, said means including a slatted conveyor extending for a substantially longitudinal distance and a vertical pressure plate resiliently urged against the conveyor, and vertical stripping rollers positioned at the rear of said second throat in a position to receive stalks conveyed thereto and to strip crops therefrom.

21. In combination, a mobile supporting frame, cutting means mounted on said frame for cutting standing stalks, means on the frame forming a narrow longitudinally-extending throat leading rearwardly and upwardly from the cutting means, vertically spaced independent conveying means positioned along the throat for moving cut stalks upwardly, the lower one of said conveying means being driven at a speed substantially higher than the upper conveyor means whereby the lower ends of the stalks are moved faster than the upper ends, means on the frame forming a second narrow longitudinally-extending substantially horizontal throat leading rearwardly from the first throat, conveying means mounted in said second throat for moving the cut stalks butt end first longitudinally in a substantially horizontal position, and crop treating means positioned at the rear of said second throat in a position to receive stalks conveyed thereto and to operate on said crops.

22. In combination, a mobile supporting frame, cutting means mounted on said frame for cutting standing stalks, means on the frame forming a narrow longitudinally-extending throat leading rearwardly and upwardly from the cutting means, said throat having a bottom extending upwardly to the rear, vertically spaced independent conveying means positioned along the throat for moving cut stalks upwardly, the lower one of said conveying means being driven at a speed substantially higher than the upper conveyor means whereby the lower ends of the stalks are moved faster than the upper ends, means on the frame forming a second narrow longitudinally-extending substantially horizontal throat leading from the first throat in laterally offset relation with respect thereto, conveying means mounted in said second throat for moving the cut stalks butt end first longitudinally in a substantially horizontal position, and crop treating means positioned at the rear of said second throat in a position to receive stalks conveyed thereto and to operate on said stalks.

23. In combination, a mobile supporting frame, cutting means mounted on said frame for cutting standing stalks, means on the frame forming a narrow longitudinally-extending throat leading rearwardly and upwardly from the cutting means, said throat having a bottom extending upwardly to the rear, vertically spaced independent conveying means positioned along the throat for moving cut stalks upwardly, the lower one of said conveying means being driven at a speed substantially higher than the upper conveyor means whereby the lower ends of the stalks are moved faster than the upper ends, means on the frame forming a second narrow longitudinally-extending substantially horizontal throat leading from the first throat in laterally offset relation with respect thereto, means for transferring stalks from the first throat laterally to the second throat, conveying means mounted in said second throat for moving the cut stalks butt end first longitudinally in a substantially horizontal position, and crop treating means positioned at the rear of said second throat in a position to receive stalks conveyed thereto and to operate on said stalks.

24. In combination, a mobile supporting frame, cutting means on said frame for cutting standing stalks, means on the frame forming a vertical throat extending upwardly and rearwardly from the cutting means and having an inclined bottom, upper inclined conveying means extending from adjacent the cutting means rearwardly and upwardly therefrom, lower inclined conveying means extending adjacent the bottom of the throat rearwardly and upwardly from the cutting means, means for operating the lower conveying means faster than the upper conveying means thereby moving the stalks into a substantially horizontal position rearwardly butts first, said vertical throat having a portion extending into the throat adjacent the upper end of each conveying means whereby stalks are stripped therefrom and are shifted laterally of the throat to avoid interference with subsequent stalks being conveyed upwardly through the throat.

25. In combination, a mobile supporting frame, cutting means on said frame for cutting standing stalks, means on the frame forming a vertical throat extending upwardly and rearwardly from the cutting means and having spaced sides and an inclined bottom, upper inclined conveying means along one of said sides extending from adjacent the cutting means rearwardly and upwardly therefrom, lower inclined conveying means at the same side of the throat extending adjacent the bottom of the throat rearwardly and upwardly from the cutting means, means for operating the lower conveying means faster than the upper conveying means thereby moving the stalks into a substantially horizontal position rearwardly butts first, said vertical throat having a portion extending into the throat at the side in which the conveying means are located adjacent the upper end of each conveying means whereby stalks are stripped therefrom and are shifted laterally of the throat to avoid interference with subsequent stalks being conveyed upwardly through the throat.

26. In combination, a mobile supporting frame, cutting means on said frame for cutting standing stalks, means on the frame forming a vertical throat extending upwardly and rearwardly from the cutting means and having an inclined bottom, upper inclined conveying means extending from forwardly of the cutting means upwardly therefrom, lower inclined conveying means extending adjacent the bottom of the throat rearwardly from the cutting means, means for operating the lower conveying means faster than the upper conveying means thereby moving the stalks into a horizontal position rearwardly butts first, said vertical throat having longitudinally spaced portions extending into the throat at one side thereof adjacent the upper ends of the conveying means whereby stalks are stripped therefrom and are shifted laterally of the throat to avoid interference with subsequent stalks being conveyed upwardly through the throat.

27. In combination, a mobile supporting frame, cutting means on said frame for cutting standing stalks, means on the frame forming a vertical throat extending upwardly and rearwardly from the cutting means and having an inclined bottom, an upper inclined conveying chain extending rearwardly and upwardly from the cutting means, a lower inclined conveying chain extending adjacent the bottom of the throat rearwardly and upwardly from the cutting means, means for operating the lower conveying chain faster than the upper conveying chain thereby moving the stalks into a substantially horizontal position rearwardly butts first, said vertical throat having a stalk deflecting portion extending into the throat adjacent the upper end of each conveying chain whereby stalks are stripped from the chains and are shifted laterally of the throat to avoid interference with subsequent stalks being conveyed upwardly through the throat.

28. In combination, a mobile supporting frame, cutting means on said frame for cutting standing stalks, means on the frame forming a vertical throat extending upwardly and rearwardly from the cutting means and having spaced sides and an inclined bottom, an upper inclined conveying chain along one of said sides extending rearwardly and upwardly from the cutting means, a lower inclined conveying chain at the same side of the throat extending adjacent the bottom of the throat rearwardly and upwardly from the cutting means, means for operating the lower conveying chain faster than the upper conveying chain thereby moving the stalks into a substantially horizontal position rearwardly butts first, said vertical throat having a stalk deflecting portion extending into the throat at the conveying chain side adjacent the upper end of each conveying chain whereby stalks are stripped from the chains and are shifted laterally of the throat to avoid interference with subsequent stalks being conveyed upwardly through the throat.

MELVILLE J. MITCHELL.
LEE P. MILLARD.

CERTIFICATE OF CORRECTION.

Patent No. 2,379,822.                                                            July 3, 1945.

MELVILLE J. MITCHELL, ET AL.

It is hereby certified that error appears in the printed specification of the above numbered patent requiring correction as follows: Page 6, first column, line 71, claim 13, before the word "faster" insert --means--; and that the said Letters Patent should be read with this correction therein that the same may conform to the record of the case in the Patent Office.

Signed and sealed this 9th day of October, A. D. 1945.

Leslie Frazer (Seal)                   First Assistant Commissioner of Patents.